United States Patent [19]

Muir et al.

[11] Patent Number: 5,031,585
[45] Date of Patent: Jul. 16, 1991

[54] ELECTROMAGNETIC BRAKE FOR A CAMSHAFT PHASE CHANGE DEVICE

[75] Inventors: Darryl J. Muir, Bellevue; John E. Brune, Parma; Brian K. Van Deusen, Augusta; James K. Day, Chelsea, all of Mich.

[73] Assignee: Eaton Corporation, Cleveland, Ohio

[21] Appl. No.: 519,969

[22] Filed: May 7, 1990

[51] Int. Cl.⁵ .............................................. F01L 1/34
[52] U.S. Cl. ............................. 123/90.17; 123/90.31; 123/501; 462/2
[58] Field of Search .................. 123/90.17, 90.31, 501; 462/2

[56] References Cited

U.S. PATENT DOCUMENTS

| | | | |
|---|---|---|---|
| 3,683,879 | 8/1972 | Timms | 123/501 |
| 3,978,829 | 9/1976 | Takahashi et al. | 123/90.17 |
| 4,561,390 | 12/1985 | Nakamura et al. | 123/90.17 |
| 4,754,727 | 7/1988 | Hampton | 123/90.17 |
| 4,841,924 | 6/1989 | Hampton et al. | 464/2 |
| 4,967,701 | 11/1990 | Isogai et al. | 123/90.17 |

FOREIGN PATENT DOCUMENTS

| | | | |
|---|---|---|---|
| 0165511 | 9/1983 | Japan | 123/90.17 |
| 0134011 | 5/1989 | Japan | 123/90.17 |

Primary Examiner—Willis R. Wolfe
Assistant Examiner—Weilun Lo
Attorney, Agent, or Firm—F. M. Sajovec

[57] ABSTRACT

An actuator for a phase change device of the type wherein a phase change is effected between an input member and output member in response to the axial movement of an advancing member interconnecting the input member and the output member, and wherein such axial movement is effected by retarding the rotation of a drum member engaged with the advancing member. The retarding force is provided by an electromagnetic wet brake mounted in juxtaposition with a brake disk surface formed on the drum in a fixed angular position but capable of limited axial movement relative to the brake disk surface.

11 Claims, 5 Drawing Sheets

ELECTROMAGNETIC BRAKE FOR A CAMSHAFT PHASE CHANGE DEVICE

This invention relates to a device for varying the angular phase relation between two rotating shafts. More specifically, the invention relates to such a device adapted to vary the angular phase relation between the crankshaft and a camshaft of an internal combustion engine.

Devices for varying or changing the angular phase relation or timing between an engine camshaft and crankshaft are well known, as may be seen by reference to U.S. Pat. Nos. 3,626,720 and 4,754,727 which are both assigned to the assignee of this patent and which are both incorporated herein by reference.

The U.S. Pat. No. 3,626,720 to Meachem et al. includes a helical ball spline mechanism for varying the phase relation in response to selective porting of engine oil pressure to axially displace a piston therein.

The U.S. Pat. No. 4,754,727 to Hampton discloses a device similar to the device herein, i.e. both include an axially displaceable advancing plate drivingly interconnecting support and drive members via straight and angular lugs or splines. The advancing plate is also threadably mounted on a drum for axial displacement along the drum in response to relative rotation between the drum and plate. Relative rotation in one direction is provided by a spring reacting between the hub and drum, and in the other direction by selective application of a frictional force for retarding rotation of the drum counter to the spring force.

The device disclosed in U.S. Pat. No. 4,841,924 represents an improvement to the device disclosed in U.S. Pat. No. 4,754,727 in that it is more compact, and includes improvements to individual components of the apparatus; however, it is intended for use in engines wherein the camshaft is driven by a toothed belt and wherein the belt must be kept free of oil, and includes an external brake mechanism to provide the retarding force to the drum. The present invention is intended for use in an engine wherein the cam phasing device can be mounted within the cam cover of the engine, and wherein the entire phase change unit can be exposed to engine lubricating oil.

U.S. Pat. No. 4,754,727 discloses several brake mechanisms for providing the required retarding force, including several electromagnetic brake configurations. The present invention is intended to provide an improvement to the magnetic brakes disclosed therein, particularly in that the brake is a wet brake wherein the brake friction material can be exposed to engine oil, means are provided to center the brake assembly with respect to the camshaft to reduce parasitic losses within the mechanism, and in that the friction surface area of the brake is increased to reduce heat generation and prolong brake life. The present invention also provides an improved magnetic circuit as compared with previous designs.

To achieve the above advantages the present invention provides a brake assembly which is supported on a bearing received on a stub shaft of the phase change device which is attached to the front end of the camshaft. The electromagnetic element of the brake is thus readily mounted in a fixed angular position relative to the cylinder head. The stationary brake member is defined by an annular channel member which encloses an electromagnetic coil and which defines magnetic pole pieces which are attracted to a flat surface of the retarding drum when the coil is energized. Oil and temperature-resistant friction pads, preferably of pyrolytic carbon, are adhered to an annular backing plate received between the pole pieces. In accordance with the invention, engine oil is routed between the friction pads and the drum, to the bearing on which the brake assembly is supported, and to other parts of the phase change device.

Additional objectives and advantages will be apparent from the following description when considered in connection with the accompanying drawings, wherein.

Figure 1:
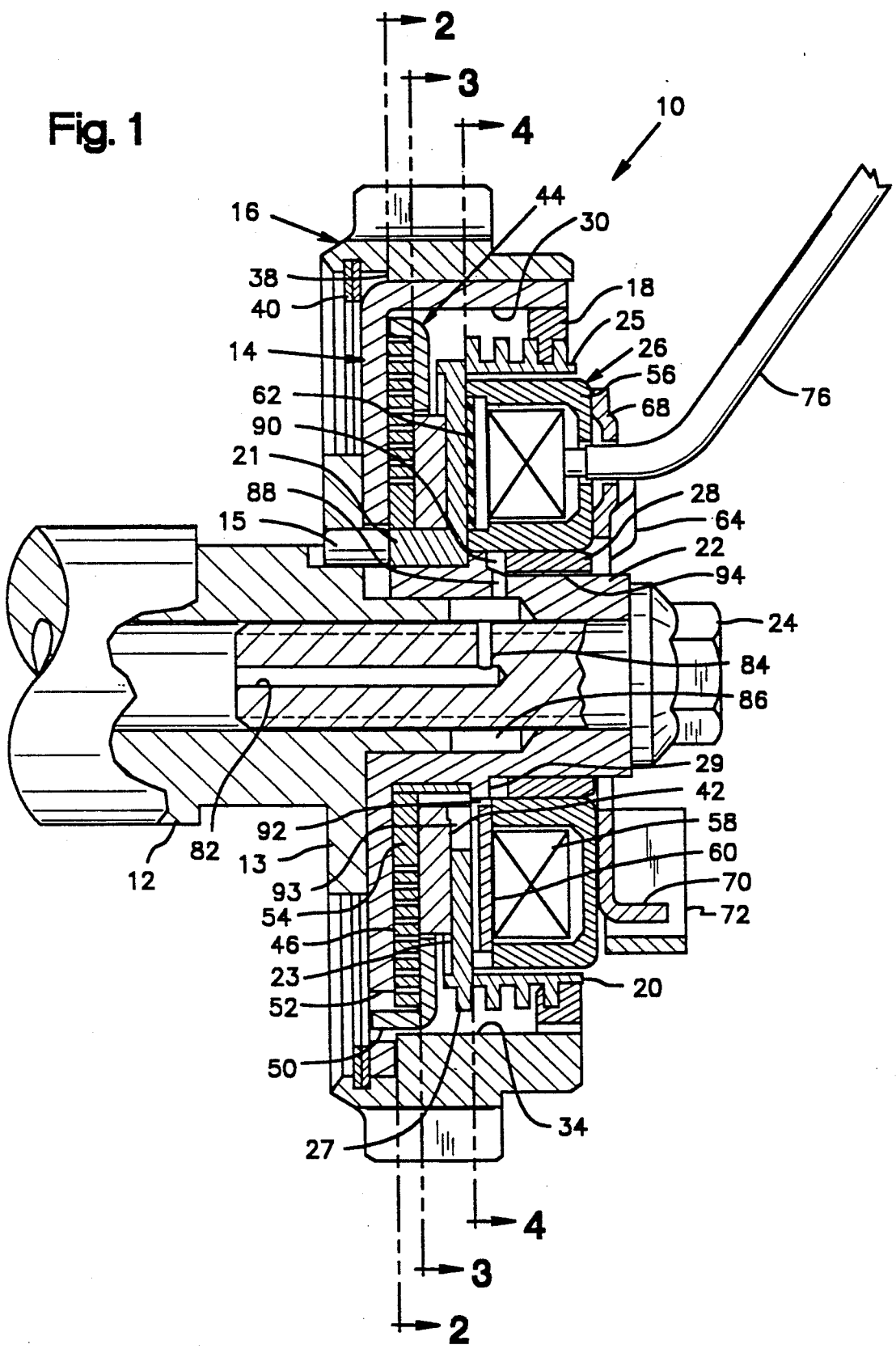
FIG. 1 is a sectional view of the phase change device including the invention.

Referring to the drawings, there is illustrated an angular phase change device 10 adapted to be fixed to and rotate about a camshaft 12 of an internal combustion engine (not shown). As is well known in the art the engine includes a crankshaft which rotates the device 10 and camshaft 12. The camshaft controls the opening and closing of the intake and/or exhaust valves of the engine in known manner. Device 10 includes a hub 14 mounted for rotation with the camshaft 12; a drive member 16 which is driven by the engine crankshaft, or by another camshaft in the case of a twin cam engine, and which is engaged with the hub 14 in a variable phase relationship therewith; an advancing plate 18 which interconnects the drive member 16 and the hub 14; and a drum 20 which interacts with the hub 14 and the advancing plate 18 and which when acted on by the brake of the present invention is operable to effect axial movement of the advancing plate, which movement effects a change in the phase relationship between the drive member and the hub as will be described in detail below. The drum is supported for rotation on a shaft 22 which is attached to the camshaft 12 by means of a threaded fastener 24; and the brake assembly of the invention, designated generally by the numeral 26 is supported on the shaft member 22 on a bearing 28.

Figure 2:
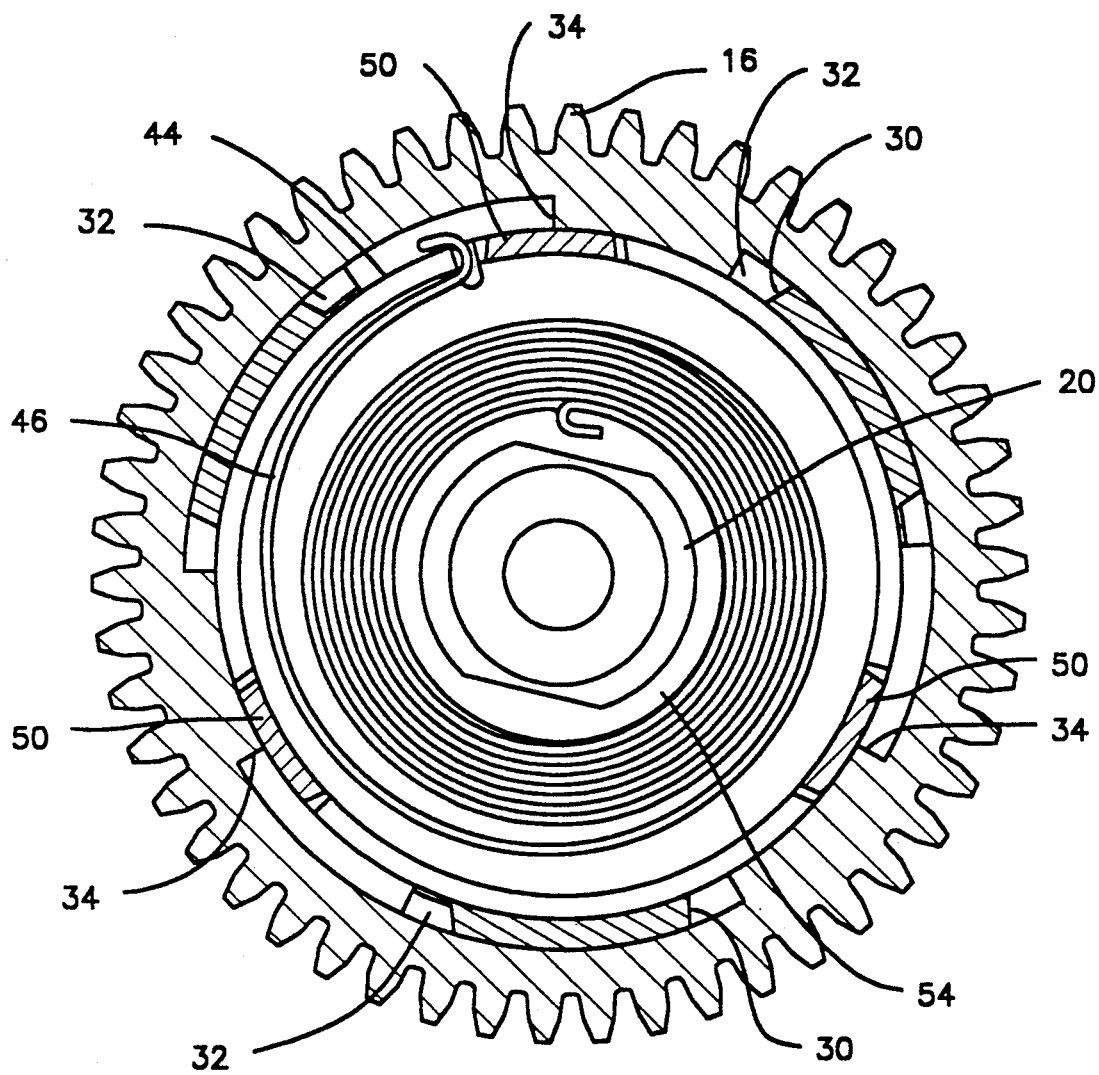
FIG. 2 is a sectional view taken at line 2—2 of FIG. 1.
Figure 3:
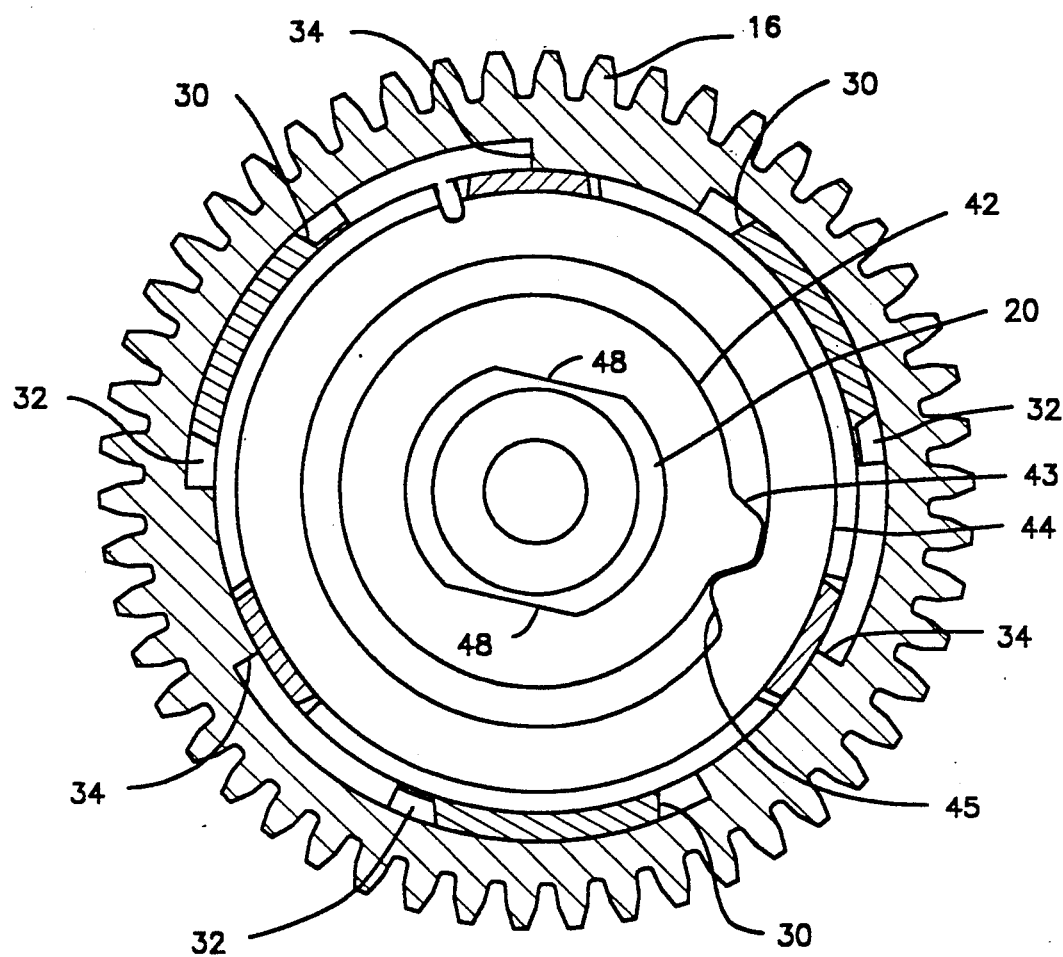
FIG. 3 is a sectional view taken at line 3—3 of FIG. 1.
Figure 5:
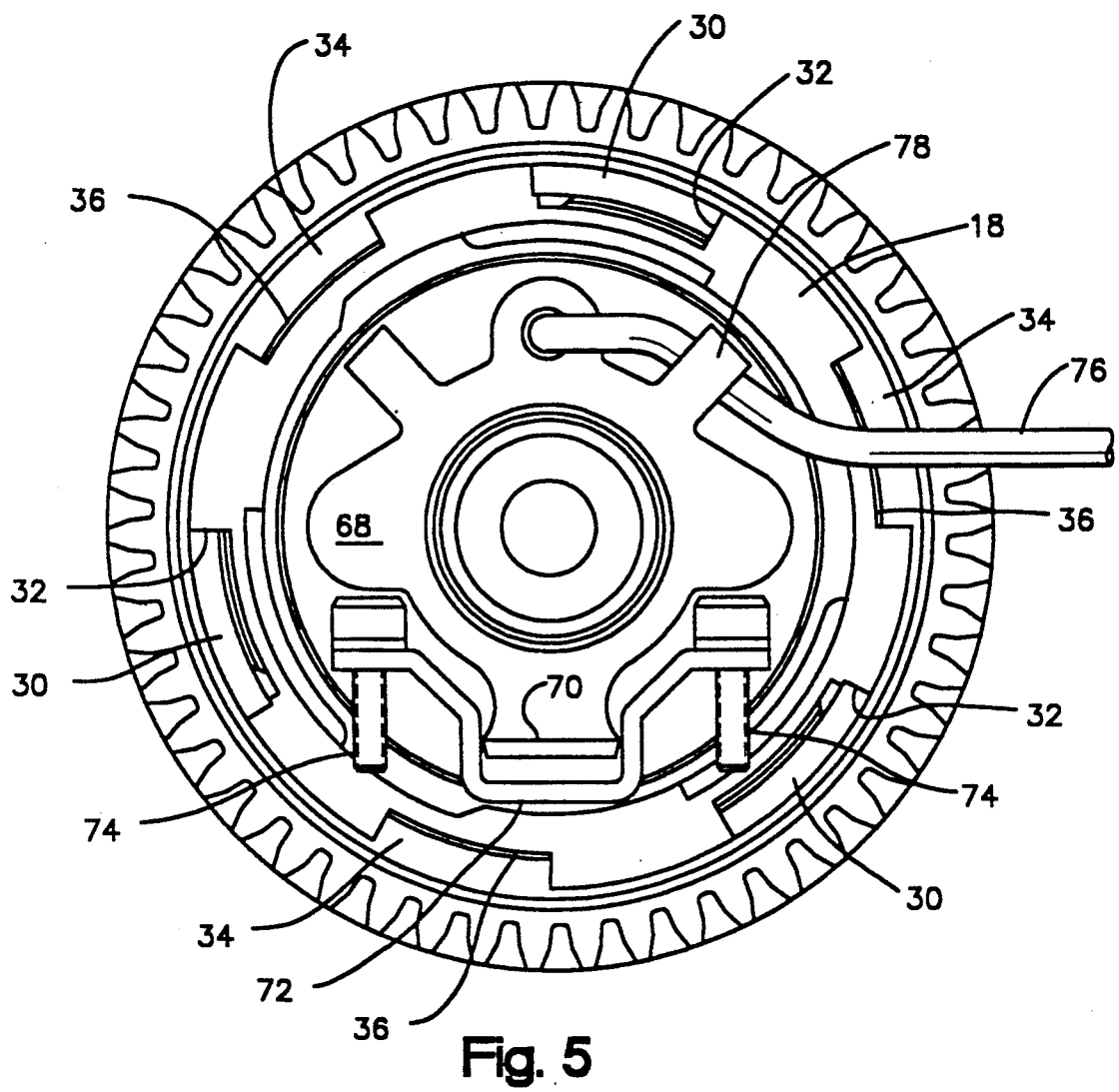
FIG. 5 is a front elevation view of the invention.

The hub 14 is an essentially flat plate which is located against a flange 13 formed on the camshaft 12 and is fixed for rotation with the camshaft by the shaft 22 and fastener 24. A dowel pin 15 received through a hole in the flange 13 and a slot in the hub 14 maintains timing between the camshaft and the hub. Referring also to FIGS. 2, 3 and 5, the hub has three lugs 30 formed thereon extending axially with respect to the camshaft and received in corresponding slots 32 formed in the advancing plate 18. The interfacing surfaces between the lugs 30 and the slots are formed at an angle to provide relative angular movement between the hub and the drive member when the advancing plate is moved axially as described in U.S. Pat. Nos. 4,754,727 and 4,841,924.

The drive member 16 is the input to the phase, change device 10, and is illustrated herein as a gear, although it can be appreciated that the input can also be a sprocket or a pulley. As illustrated herein the input gear or drive member is supported by the hub for limited relative rotation therewith, and includes three lugs 34 which are received in corresponding slots 36 formed in the advancing member angularly offset from the slots 32, as best shown in FIG. 5. As illustrated herein the interfacing surfaces between the lugs 34 and the slots 36 are straight to provide positive angular engagement between the drive member 16 and the advancing member 18 while permitting relative axial movement therebetween. As shown in FIG. 1, the relative axial positions of the drive member and the hub are maintained by the outer portion of the hub (between the lugs 30), being received between a shoulder 38 formed on the drive member and a retaining ring 40 received in a slot formed in the drive member.

The drum 20 comprises an axially extending portion 21 mounted for rotation on the shaft 22, a radially extending portion 23 which also functions as a brake disc as will be described below, and a drum portion 25 which has external threads 27 formed thereon in engagement with corresponding internal threads formed on the advancing plate 18. The axial position of the drum 20 relative to the hub 14 is maintained by the dimension between the hub and a lip 29 formed on the shaft 22 when the shaft is bottomed out against the hub as shown in FIG. 1.

In accordance with the known operation of the phase change device, the axial movement of the advancing plate 18 which results in relative angular rotation between the drive member 16 and the hub 14 is produced by retarding the rotation of the drum 20 with respect to the hub 14. Referring particularly to FIGS. 1, 2 and 3, the drum 20 and the hub 14 are interconnected by means of an inner stop member 42 which is fixed to the drum, an outer stop member 44 which is fixed to the hub 14, and a clockspring 46 acting between the hub and the drum. The inner stop member 42 is a disc member which is fixed to the drum by means of flats formed on the axially extending portion 21 of the drum and corresponding flats formed in the inside diameter of the stop, the interface of the flats being represented by the reference numeral 48 in FIG. 3. The outer stop 44 is a shallow cup-shaped member in surrounding relation to the inner stop member, and having three lugs 50 formed thereon which are received in apertures 52 formed in the hub. Referring to FIG. 2, the outer end of the spring 46 is hooked onto a notch formed in the rim of the outer stop member 44, and the inner end of the spring is hooked into a slot formed in a disc member 54 which is also fixed to the axial portion 21 of the drum by means of the flats on the drum and corresponding flats formed in the disc (FIG. 2). It can be appreciated that the inner stop member 42 and the disc member 54 could also be formed integrally with the drum.

Referring to FIG. 3, relative rotation between the inner stop member 42 and the outer stop member 44 is limited to slightly less than 360° by means of a radially outwardly extending tab 43 formed on the inner stop member 42 and a radially inwardly extending tab 45 formed on the outer stop member 44. The spring 46 effectively connects the inner and outer stops and normally biases the outer stop relative to the inner stop into the positions shown in FIG. 3 with the tabs 43 and 45 engaged as shown, thus also biasing the drum 20 relative to the hub 14 into the position shown in FIG. 1 wherein the advancing plate 18 is advanced along the threads 27 to its rightwardmost position relative to the drum 20, the drive member 16 and the hub 14.

For purposes of illustration the relative positions of the various elements shown in the drawings are considered to represent a base or first phase relationship between the drive member 16 and the hub 14, and thus between the crankshaft and the camshaft 12. In accordance with the known operation of the phase change device, when a change in the phase relationship between the crankshaft and camshaft is desired, the rotation of the drum 20 is retarded relative to the hub 14 and against the force of spring 46, such retardation causing the advancing member 18 to rotate relative to the hub, and thus causing it to move axially leftward along the threads as viewed in FIG. 1. As described above, such axial movement of the advancing member causes, by virture of the angled contact surfaces formed on the advancing member and on the lugs 30 of the drive member, the drive member to rotate relative to the hub, thus effectively changing the phase relationship between the crankshaft and the camshaft.

As discussed above, the retarding force can be applied to the drum 20 in a variety of ways. The present invention provides an improved electromagnetic brake system for providing the retarding force to the drum.

Referring to the drawings, the brake assembly 26 comprises housing 56 in the form of an annular channel member, a coil 58 received within the housing, an annular backing plate 60 which is formed of a non-magnetic material and is press fit or staked into the open end of the housing friction material 62 adhered to the plate 60, and the face of the radially extending portion 23 of the drum 20.

Figure 4:
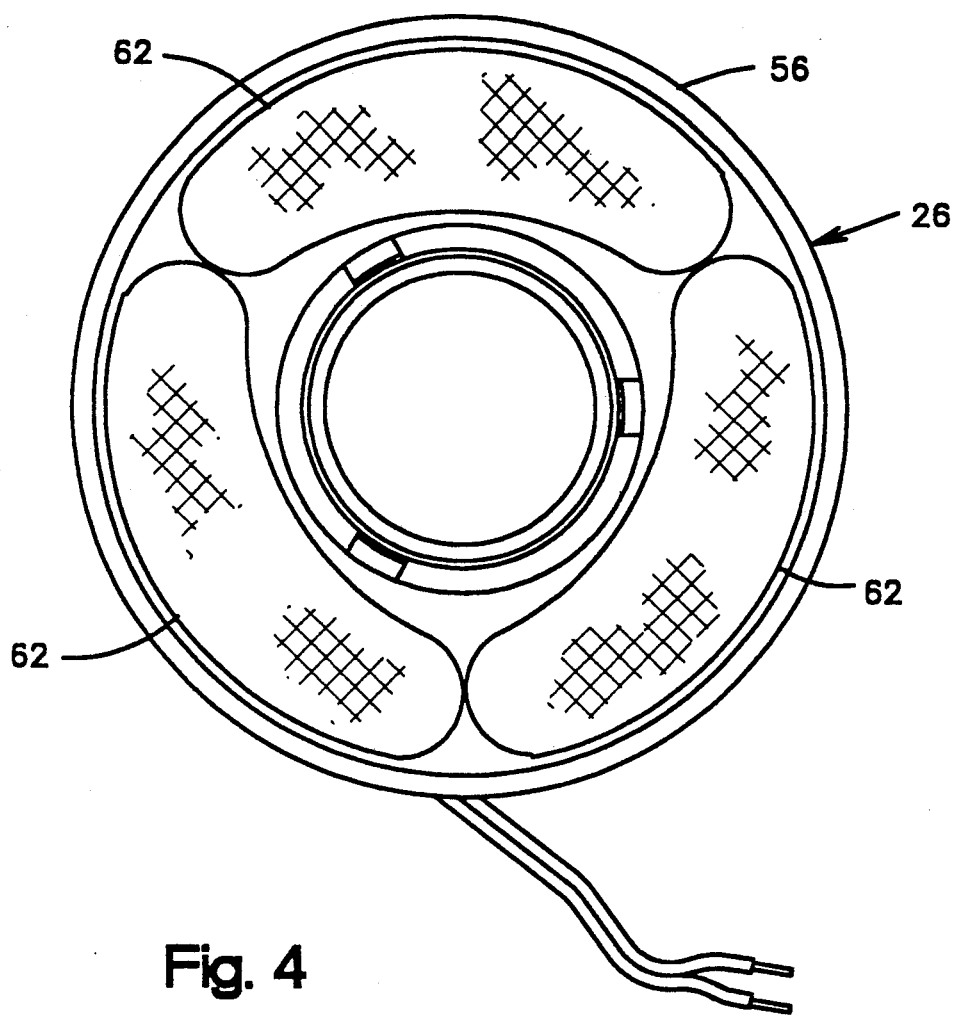
FIG. 4 is an elevation view taken at line 4—4 of FIG. 1.

As shown in FIG. 4, the friction material 62 is preferably applied as a plurality of individual pads of a material known as pyrolytic carbon, the pads interfacing with the radial portion 23 on the drum 20. It can be appreciated that other materials can also be used for the friction pads, such as sintered brass, paper and other metallic or non-metallic materials.

Referring to FIG. 5, a typical mounting arrangement for the brake assembly is illustrated. It will be appreciated that the only function of the mounting assembly is to maintain the housing 56 in a fixed angular position relative to the cylinder head, while permitting limited axial movement as required for brake actuation; therefore, the exact arrangement can be easily tailored to suit a particular application. In the illustrative embodiment the mounting assembly comprises a formed sheet metal member 68 welded or otherwise adhered to the housing 56, and having an axially extending tab 70 formed thereon, and a retention member 72 which can be fixed to a convenient part of the engine by bolts 74 or other suitable means. As illustrated herein, the retention member is in the form of a U-shaped member which partially surrounds the tab 70 to fix the angular position of the housing 56 while permitting limited axial movement thereof. As illustrated herein, the connecting cable 76 of the coil is routed through a hole formed in the member 68, and a tab 78 is formed on the member 68 to serve as a strain relief for the cable. Since the entire unit 10 is exposed to engine oil, the coil 58 is sealed within the housing 56 to prevent oil penetration.

In accordance with a preferred embodiment of the invention the clutch assembly 26 operates in a wet mode, being supplied with engine oil. Referring to FIG. 1, the fastener 24 has a blind bore 82 formed therein which intersects a cross bore 84 which opens into a cavity 86 defined between the end of the camshaft 12 and the bottom of a counterbore formed in the shaft 22. A cross bore 88 formed in the shaft also intersects the cavity 86 and communicates with annular cavity 90 defined between the end of the bearing 28 and the lip 29.

A notch 92 cut out of the housing 56 provides an oil path between the friction material 62 and the brake disc surface of the hub 20. An aperture 93 is formed in the drum 20 to also provide an oil path to the outer diameter of the drum to provide lubrication for the threaded interface between the drum and the advancing plate. Since the unit 10 is enclosed within the engine cam cover, excess oil drains back into the engine. To provide additional lubrication for the bearing 28, an axial flat 94 is formed on the outer diameter of the shaft 22 to provide an oil passage communicating with the annular cavity 90.

Since the clutch assembly 26 is not positively restrained axially, in normal operation, i.e. with the clutch deenergized, the friction material pads are separated from the surface 66 by a film of engine oil. When the coil 58 is energized, the housing 56 is attracted to the drum 20, which is effective to press the friction pads 62 against the brake disc surface of the drum with sufficient force to overcome the force of spring 46 and thus retard the rotation of the drum to initiate the phase-changing axial movement of the advancing plate 18 as described above. Since the opposing force of the spring is proportional to the relative angular displacement of the drum, the retarding force applied by the coil and the resulting degree of axial movement of the advancing plate are proportional to the current applied to the coil. Accordingly, the degree of phase change obtainable is proportional to the current applied to the coil and is infinitely variable between the limits of axial movement of the advancing plate.

We claim:

1. In a phase change device comprising a first shaft; an input member supported for rotation on said first shaft; an output member fixed to said first shaft; advancing means interconnecting the input and output members, said advancing means being operative upon axial movement to effect limited relative rotation between the input and output members; drum means supported for rotation on said first shaft and engaged with said advancing means to effect said axial movement of said advancing means when a retarding force is applied to said drum means; and actuating means operable to apply said retarding force; the improvement wherein said actuating means comprises an electromagnetic brake assembly, said electromagnetic brake assembly comprising an annular housing defining pole pieces of the electromagnet, a magnetic coil received in said housing, a nonmagnetic plate member enclosing said housing, friction material adhered to said plate member, a brake disc surface formed on said drum, and means for mounting said housing on said first shaft in juxtaposition with said brake disc surface in a substantially fixed angular position while permitting limited axial movement relative to said disc surface.

2. Apparatus as claimed in claim 1, including bearing means on said housing supporting said housing for rotation with respect to said first shaft.

3. Apparatus as claimed in claim 1 in which said friction material comprises one or more pads of pyrolytic carbon material.

4. Apparatus as claimed in claim 1, including means providing lubricating oil to the interface between said disc surface and said friction material.

5. Apparatus as claimed in claim 1 in which said means for mounting said housing comprises a member extending axially outwardly from said housing, and a bracket member mounted in fixed relation to said housing, said bracket member including surfaces engageable with said projection to substantially prevent angular movement of said housing relative to said bracket.

6. Apparatus as claimed in claim 4, in which said first shaft is defined by a camshaft of an internal combustion engine, and said means providing lubricating oil comprises conduit means directing engine lubricating oil through said camshaft to said interface.

7. Apparatus as claimed in claim 2, including means for directing lubricating oil to said bearing.

8. Apparatus as claimed in claim 1, in which said first shaft is a camshaft of an internal combustion engine; and including a second shaft coaxial with and attached to said camshaft, said drum means being journaled on said second shaft; and bearing means received between said housing and said second shaft.

9. Apparatus as claimed in claim 8, including a threaded fastener received through a bore formed in said second shaft and threaded into a bore formed in said camshaft, said threaded fastener including oil passages formed therein for directing engine oil to said phase change device.

10. Apparatus as claimed in claim 9, in which said second shaft has a counterbore formed therein, a portion of which counterbore defines a first annular cavity between said first and second shafts and surrounding said threaded fastener; said oil passages in said threaded fastener comprise an axial bore formed in said fastener, a radial bore formed in said fastener intersecting said axial bore and opening into said first annular cavity; and including a radial bore formed in said second shaft defining a conduit between said counterbore and the annular region between said housing and said second shaft; said apparatus further including means formed on said housing defining an oil flow path between said annular region and the interface between said friction material and said brake disk.

11. Apparatus as claimed in claim 10, including conduit means formed between said bearing and said second shaft, said conduit means opening into said annular region.

* * * * *